United States Patent [19]

Tanaka et al.

[11] Patent Number: 4,660,219
[45] Date of Patent: Apr. 21, 1987

[54] EXTENSION RINGING ARRANGEMENT KEY TELEPHONE SYSTEM

[75] Inventors: Kinzi Tanaka; Toru Tagawa, both of Kawasaki; Yoshiji Tanimoto; Minoru Okumura, both of Tokyo, all of Japan

[73] Assignees: Nitsuko Limited, Kanagawa; Nippon Telegraph and Telephone Corporation, Tokyo, both of Japan

[21] Appl. No.: 830,084

[22] Filed: Feb. 18, 1986

[30] Foreign Application Priority Data

Mar. 18, 1985 [JP] Japan .................................. 60-53816

[51] Int. Cl.⁴ ............................................ H04M 3/02
[52] U.S. Cl. .................................... 379/164; 379/156
[58] Field of Search ............... 179/99 LC, 99 R, 99 H, 179/99 LS

[56] References Cited

U.S. PATENT DOCUMENTS

| 4,046,972 | 9/1977 | Huizinga et al. | 179/99 LS |
| 4,196,316 | 4/1980 | McEowen et al. | 179/99 R |
| 4,490,583 | 12/1984 | Bednarz et al. | 179/99 LC |
| 4,491,693 | 1/1985 | Sano et al. | 179/99 R |
| 4,564,724 | 1/1986 | Nakayama et al. | 179/99 R |
| 4,572,928 | 2/1986 | Nishimura et al. | 179/99 R |

Primary Examiner—James L. Dwyer
Attorney, Agent, or Firm—Burns, Doane, Swecker & Mathis

[57] ABSTRACT

An extension ringing arrangement for a key telephone system wherein a plurality of key telephone sets are connected respectively through associated plurality of channel units to main equipment including a main CPU. The channel units as well as an interface unit, including a sub-CPU interconnected to the main CPU are connected in parallel to the main equipment. The interface unit is of the type used for interconnecting individual line telephone sets to the key telephone system, whereby a ringing of a selected one of the key telephone sets from a calling party is made possible, with a simple arrangement effectively utilizing existing components of the key telephone system.

1 Claim, 1 Drawing Figure

EXTENSION RINGING ARRANGEMENT KEY TELEPHONE SYSTEM

TECHNICAL BACKGROUND OF THE INVENTION

This invention relates to an extension ringing arrangement for a key telephone system.

The extension ringing arrangement of the present invention is to be used in conjunction with a key telephone system which includes main equipment and a plurality of key telephone sets as extensions, and is useful in particular in allowing one of the key telephone sets to be automatically ringing by a calling party through central office (CO) line.

DISCLOSURE OF PRIOR ART

In general, a key telephone system comprises main equipment and a plurality of key telephone sets and is adapted to perform not only ordinary originating and terminating CO line calls but also inter-com calls, CO-line-call holding and transferring and many other functions. Yet, it is often that an individual line telephone set is used in association with the key telephone system, in which event, however, an interface circuit is required to be interposed for interconnection of the individual line telephone sets to the main equipment, because the former has no way of cooperating with the latter.

It is noticeable, on the other hand, that such individual line telephone set can be directly rung by a terminating CO line call by dialing the subscriber number of the particular telephone set, whereas it has been difficult to adapt the key telephone system to a selective ringing of one of the key telephone sets in the system directly with the CO line call, by means of a simple modification of a known arrangement of the system.

TECHNICAL FIELD OF THE INVENTION

A primary object of the present invention is, therefore, to provide an extension ringing arrangement for a telephone system, which is simple and can be incorporated in existing facilities of the latter system, so as to allow a particular one of the key telephone sets in the system to be directly rung from the CO line side and thus to increase the function of the known key telephone system.

According to the present invention, this object can be attained by an extension ringing arrangement for a key telephone system which comprises main equipment including a main CPU, a plurality of key telephone sets interconnected to the main equipment through respective channel units, and an interface means including a sub-CPU interconnected to the main CPU and of the same type as the one for use in interconnecting the individual line telephone set to the key telephone system, while the channel units and interface means are connected in parallel to the main equipment.

Other objects and advantages of the present invention shall be made clear in the following description of the invention detailed with reference to a preferred embodiment shown in an accompanying drawing.

Figure 1:
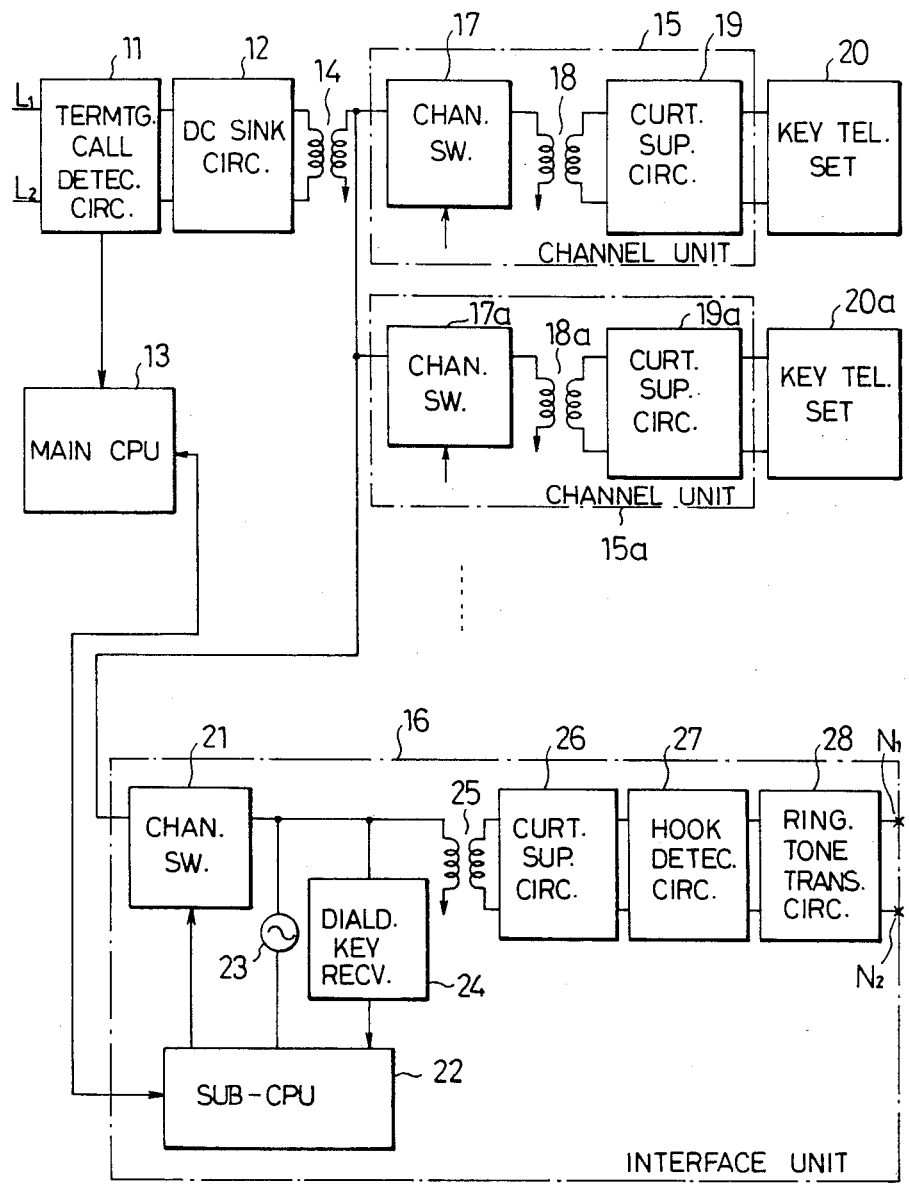
FIGURE 1 is a block diagram of an extension ringing arrangement for the key telephone system of the invention, which includes an interface means commonly used to interconnect an individual line telephone set to the system, and channel units for the key telephone sets and connected to the interface means.

While the invention shall now be described with reference to the preferred embodiment shown in the drawing, the intention is not to limit the invention to the particular embodiment shown but rather to cover all alterations, modifications and equivalent arrangements possible within the scope of appended claims.

DISCLOSURE OF PREFERRED EMBODIMENT

Referring to the drawing, CO line wires $L_1$ and $L_2$ are connected to a terminating call detecting circuit 11 which is connected to a DC sink circuit 12. An output of the detecting circuit 11 is also applied in parallel to a main CPU 13, and the DC sink circuit 12 is connected to a primary winding of a first channel transformer 14. Connected in parallel to a secondary widing of the transformer 14 are a plurality of two or more channel units 15, 15a and an interface unit 16 of the type used for interconnecting the individual line telephone sets to the main CPU 13.

The channel units 15, 15a comprise respectively a channel switch 17, 17a connected on one side directly to the secondary winding of the transformer 14 and on the other side to a primary winding of a second channel transformer 18, 18a a secondary winding of which is connected to a current supply circuit 19, 19a. A plurality of key telephone sets 20, 20a are connected respectively to the current supply circuit 19, 19a so as to receive terminating CO line call signals through the channel unit 15, 15a to be rung.

On the other hand, the interface unit 16 comprises a channel switch 21 connected directly to the secondary winding of the first channel transformer 14, a sub-CPU 22 interconnected with the main CPU 13 to act on the channel switch 21, a parallel connection of a tone source 23 and a dialled-key receiver 24 between the switch 21 and the sub-CPU 22, a third channel transformer 25 connected at a primary winding to the channel switch 21, a current supply circuit 26 connected to a secondary winding of the transformer 25, and a sequential connection to the circuit 26 of a hook detecting circuit 27 and a ringing tone transmitting circuit 28.

The operation of the arrangement according to the present invention shall be referred to next.

When a terminating CO line call signal from a calling party reaches the CO line wire $L_1$ and $L_2$, the main CPU 13 detects the signal through the detecting circuit 11, and causes the call signal's data to be sent to the sub-CPU 22 in the interface unit 16 so that the channel switch 21 in the interface unit 16 will be turned ON as controlled by the sub-CPU 22.

In the interface unit 16, the channel switch 21 thus turned ON causes the tone source 23 to have a ringing tone signal transmitted to the calling party to let him know that a line connection has been completed. Acknowledging this ringing tone, the calling party further dials a specific extension number of a desired receiving party allotted to one of the telephone sets in the key telephone system, which number is detected by the dialled key receiver 24 and is provided as detected data to the sub-CPU 22. Then, a ringing operation is performed under the control of the sub-CPU 22 and main CPU 13 with respect to the key telephone set designated by the dialled extension number so that the channel switch in the channel unit corresponding to the extension number will be turned ON, whereby the designated key telephone set is connected to the CO line wires $L_1$ and $L_2$ to provide a speach channel between the parties.

In the present invention, in particular, it is possible to utilize a known interface unit of the type which allows an individual line telephone set to be connectable with the key telephone system. If required, therefore, the individual set may be connected to output terminals $N_1$ and $N_2$ of the ringing tone transmitting circuit 28 in the interface unit 16, in which event this individual set may call a desired one of the thus interconnected key telephone sets in the system through the sub-CPU 22 and main CPU 13, substantially with the same ringing operation as in the foregoing achieved by the function of the interface unit responsive to the terminating CO line call. Accordingly, it will be appreciated that the ringing of selected one of the telephone sets in the key telephone system from the CO line side can be made possible by a common use of the interface unit for interconnecting the individual line telephone set to the system, that is, with a simple arrangement and a simple parts manufacture for the entire system.

What is claimed as our invention is:

1. An extension ringing arrangement for a key telephone system comprising main equipment including a main CPU, a plurality of key telephone sets interconnected in parallel to said main equipment respectively through an associated plurality of channel units, and an interface means including a sub-CPU interconnected to said main CPU and connected in parallel to said channel units, wherein said interface means comprises means for transmitting a ringing tone allowing a calling party to recognize a connection of said key telephone system with CO line in response to a terminating CO line call, and means for detecting an extension number of a selected one of said key telephone sets further dialed by said calling party to turn ON a corresponding one of said channel units connected to said selected key telephone set, said interface means further comprising a channel switch connected to said sub-CPU, and said ringing tone transmitting means comprising a tone source driven by said channel switch turned ON by said sub-CPU, said interface means further comprising a receiver which detects said extension number in response to said turning ON of said channel switch through said sub-CPU, a detection output of said receiver being provided, through said sub-CPU and main CPU to one of said channel untis which corresponds to said selected key telephone set so as to turn such telephone set on and connect it to said CO line.

* * * * *